Oct. 19, 1926.  1,604,096
F. W. HENKE, JR
MEANS FOR SECURING A REMOVABLE CAP TO A GEAR CASE EQUIPPED WITH A LOCK
Filed March 20, 1923    5 Sheets-Sheet 3

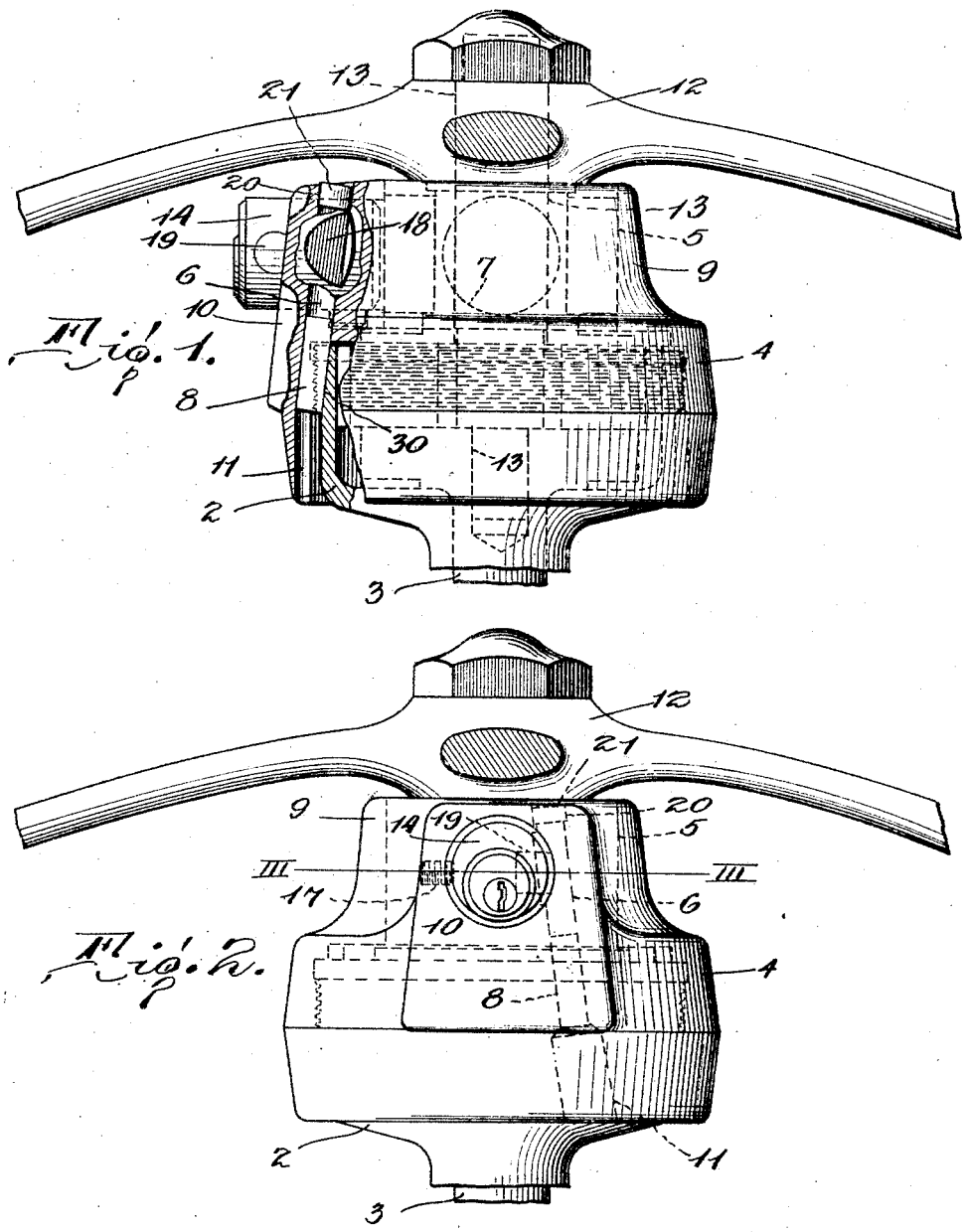

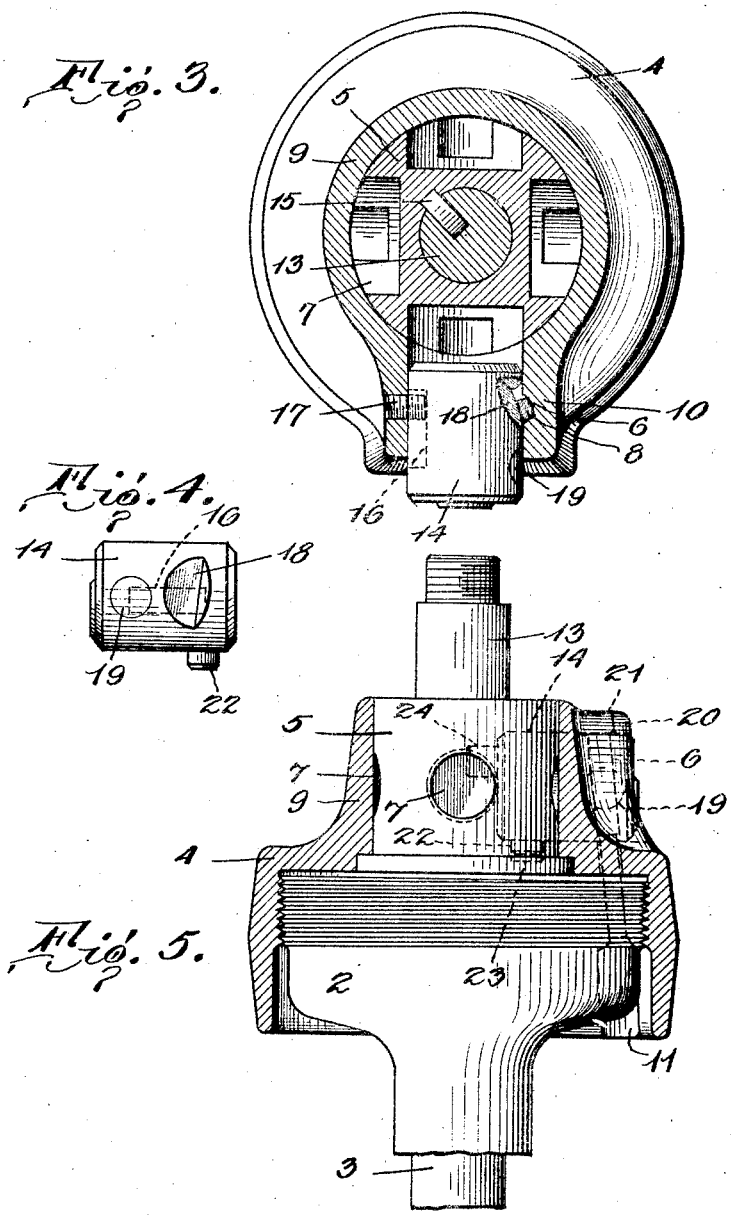

Inventor
Fredrick W Henke Jr.
By John S. Barker
Attorney

Oct. 19, 1926.  
F. W. HENKE, JR  
1,604,096  
MEANS FOR SECURING A REMOVABLE CAP TO A GEAR CASE EQUIPPED WITH A LOCK  
Filed March 20, 1923      5 Sheets-Sheet 4

Inventor  
Frederick Henke Jr.  
By John S. Barker  
Attorney

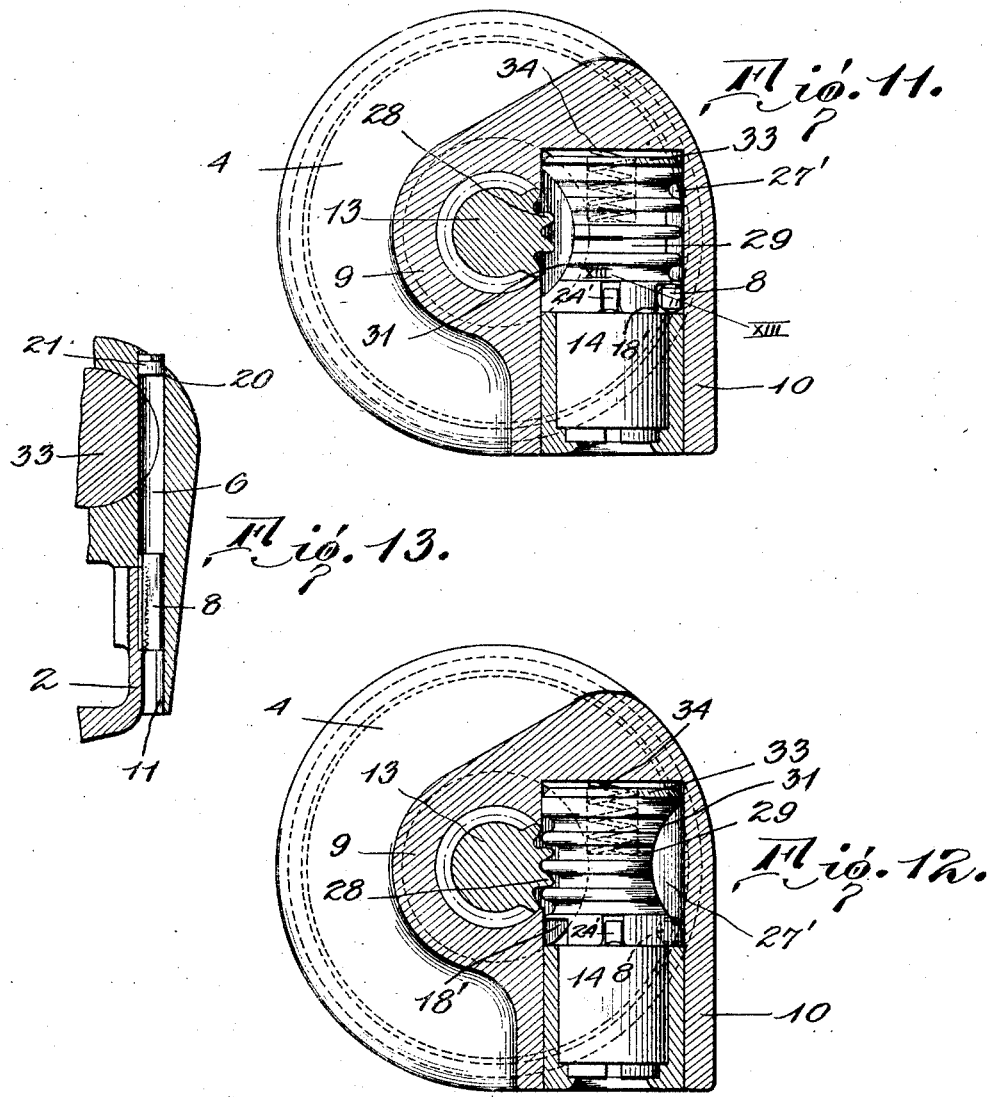

Patented Oct. 19, 1926.

1,604,096

UNITED STATES PATENT OFFICE.

FREDERICK W. HENKE, JR., OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE.

MEANS FOR SECURING A REMOVABLE CAP TO A GEAR CASE EQUIPPED WITH A LOCK.

Application filed March 20, 1923. Serial No. 626,322.

My invention relates to means for securing a removable cap to a gear case where one of the united parts is equipped with a lock. The most familiar example of the use to which my invention may be put is in connection with a lock for the steering mechanism of an automobile, where the steering mechanism is of the planetary gear or "Ford" type. In automobile locks of the type just referred to, the cap of the gear case which surrounds the planetary gearing of the steering mechanism, is the stationary member to which a rotating part of the gear is locked to prevent unauthorized movement of the car during the absence of the owner. It therefore becomes necessary to unite the cap to the body of the gear case by means which cannot be easily removed by one seeking to tamper with the lock; else the lock would be ineffective, since the cap, should it not be rigidly united with the gear case, could be turned on the threads employed to unite them, even when the lock connects the cap with the rotating part of the steering mechanism. It is, however, highly desirable that the means employed to unite the cap to the gear case should be removable at times, as for instance when it becomes desirable or necessary to take off the cap for inspection of the planetary gearing, for lubricating the latter, or for other purposes.

My invention, therefore, has for its object to provide means for rigidly uniting together the gear case and its cap, that are accessible when the lock is in position to unlock or free the steering mechanism, but which is inaccessible and therefore cannot be removed, when the lock is in its other or locking position.

In the accompanying drawings—

Figure 1 is an elevation, partly in section, of the case and cap which enclose the planetary gear of the steering mechanism of an automobile, to which my invention is applied; the gear case cap being equipped with a cylindrical lock for the steering mechanism, the body of which lock is moved on lines parallel with its axis, as it is adjusted to locking and unlocking positions.

Fig. 2 is an elevation showing the parts illustrated in Fig. 1 when viewed from a position at right angles to the point of view of Fig. 1.

Fig. 3 is a horizontal section taken on the line III—III of Fig. 2.

Fig. 4 is an elevation of the lock separate from its seat.

Fig. 5 is an elevation partly in section illustrating my invention applied to an automobile locking mechanism, similar to that shown in Figs. 1 to 3, except that the case of the lock turns about its axis, making a partial rotation in moving from locking to unlocking position, and vice versa.

Figs. 11 and 12 are horizontal sections taken on the line XI—XI of Fig. 10, the former showing the steering mechanism unlocked and the latter locked.

Fig. 13 is a detail vertical sectional view, parts being broken away, illustrating the lock mechanism of Figs. 9 to 12 in the unlocked position represented in Fig. 11.

Figure 6:
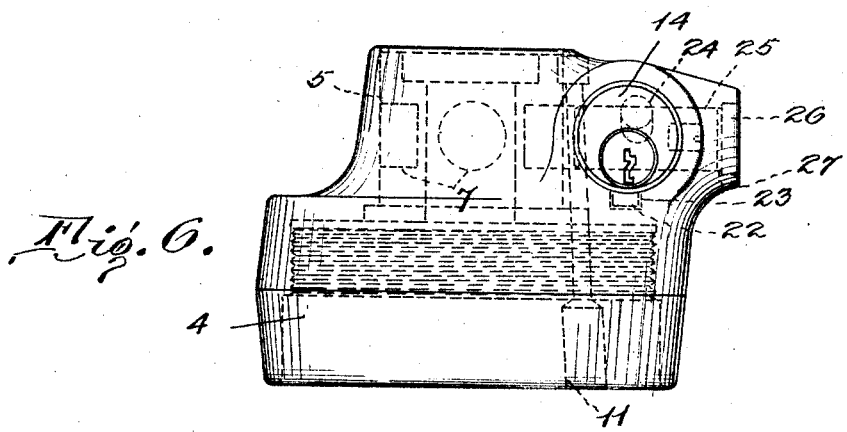
Fig. 6 is an elevation showing the parts illustrated in Fig. 5 when viewed from a position at right angles to the point of view of Fig. 5.

Referring to the drawings, 2 designates the case at the head of the stationary post 3, surrounding and protecting planetary gearing such as is used in the steering mechanism of Ford cars. The gear case is provided with a cap 4 united thereto by screw threads in the usual manner. 13 designates the rotatable pinion shaft to which is secured the hub 12 of the steering wheel. Motion is transmitted from the pinion shaft 13, through gearing not illustrated, to the steering shaft 35. These parts are, in their general features, of well known construction and need not be further described, nor illustrated in detail.

A cylindrical collar 5 is united to the pinion shaft 13 by a key 15, and constitutes a part of the locking mechanism, having formed in it a series of recesses 7 with which engage a movable part of the lock 14, when the steering mechanism is to be locked.

The cap 4 of the gear case is provided with an extension 9 that surrounds the collar 5 closely fitting the latter. This extension is provided with an offset 10 in which is formed the seat for the lock 14, the body of which is preferably cylindrical. The lock may be of any desired construction, that illustrated being a key-operated pin tumbler lock. The lock represented in Figs. 1 to 4 is adapted to move bodily on right lines parallel with its axis, from the position represented in Fig. 3,—where its body is drawn out to disengage the collar 5, releasing the pinion shaft 13, and thus permitting the steering mechanism to be operated—to its locking position, in which the lock casing is moved into its seat and the inner end thereof enters one of the recesses in the collar 5, preventing the rotation of the pinion shaft 13 and thereby locking the steering mechanism. A groove 16 is formed in the outer face of the lock casing into which extends a pin 17 seated in the offset portion 10 of the gear case cap. The pin and groove limit the movements of the lock casing, stopping it, at one limit, in position to lock the steering mechanism, and at the other limit, in position to release the locking mechanism.

In order to prevent the gear cap from being turned upon the casing 2 after it has been screwed into place I employ a locking pin 8. This pin is formed of hard metal with cutting edges and is preferably angular in cross section. When in position it lies partially in a groove 6 formed to receive it in the inner wall of the cap 4, and partially in a recess 30 in the outer wall of the gear case 2. The groove 6 for the locking pin passes through the offset portion 10 of the gear case cap, starting from the upper face of said offset and extending downward, preferably in an inclined direction, cutting the opening in the offset constituting the seat for the lock body 14 and terminating in the inner screw-threaded face of the cap. It is not necessary that the groove in the screw-threaded periphery of the gear case 2 should be formed in advance, because this may be, and in practice is, cut by the sharpened edges of the locking pin 8 as it is driven into place, the metal of the gear case being considerably softer than that of which the locking pin is formed. The lower portion or skirt of the gear case cap is cut away or relieved on its inner surface at the end of the groove 6, as indicated at 11 to permit a tool, inserted from below the cap, to engage with the end of the locking pin to unseat it. In order to secure and lock the cap to the gear case the former is screwed down tightly upon the gear case, and then one of the locking pins 8 is passed into the groove 6 from above, and, by means of a drift or other tool, driven down and into the holding position indicated in Fig. 1. When the advancing end of the pin comes into contact with the upper edge of the gear case it cuts its way through the threaded face of the latter, forming a seat 30 for itself as it is being finally driven to the locking position represented in Fig. 1. It is apparent that the pin 8 could not be passed through the channel or groove 6, from its upper, open end to its locking position, if the body of the lock 14 were a perfect cylinder and the lock were in its seat. However, to permit the locking pin to be inserted in place after the lock 14 has been seated and secured in position, I cut away a part of the lock body, as represented at 18, locating the cut-away portion in such position that when the lock is moved to release the steering mechanism the cut away parts registers with the groove 6. When, however, the lock is moved to position to lock the steering mechanism the cutaway portion 18 of the lock casing no longer is in line with the groove 6, but instead an unmutilated and truly cylindrical face of the lock body lies opposite the groove and partly closes it, making it impossible for the pin 8 to be driven up through the groove 6 from its position uniting the cap and gear case, so long as the lock maintains the position just referred to. Whenever it becomes necessary to remove the cap 4 the body of the lock is moved to bring the portion 18 into register with the groove 6, when the groove will be unrestricted and the pin may be driven out from its locking position by the use of a tool inserted from below through the relief cut or groove 11.

In the arrangements shown in Figs. 1 to 4 the slot 16 is straight or longitudinal and parallel with the axis of the lock casing.

I may set into the wall of the lock body or casing a hardened steel piece, 19, in such position that it lies partially in the groove 6 when the lock casing or body is moved to locking position, making it impossible or difficult to cut away the body of the lock at this point, as might be attempted by one seeking to interfere with the lock and finding that the lock casing 14 interfered with the removal of the pin 8.

At the upper end of the groove 6 is formed an enlarged recess 20 into which is tightly fitted a plug 21, preferably formed of steel. This will be shaped so that its outer face will conform to the adjacent surface of the extension or offset of the cap, making it difficult to obtain access to the groove 6 after the plug has been set in place. When, however, the locking pin is being removed the upper end of the pin 8 will engage with the underface of the plug 21 and drive it from its seat as the pin is forced upward and outward.

Figure 7:
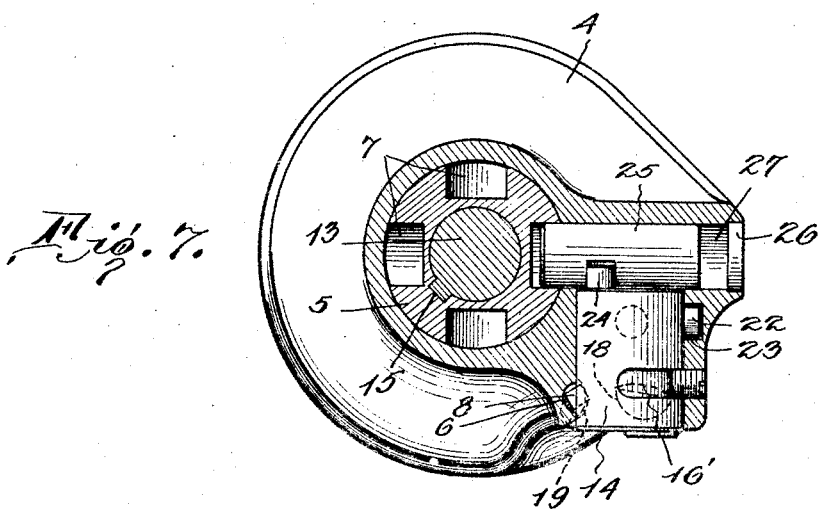
Fig. 7 is a horizontal sectional view of the form of mechanism illustrated in Fig. 6.
Figure 8:
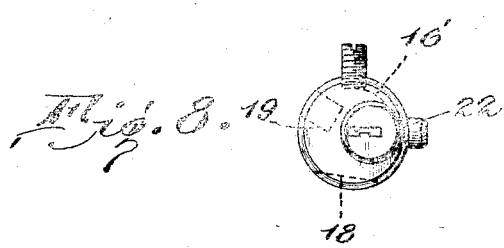
Fig. 8 is a detached end view of the lock represented in Figs. 5 to 7.

That embodiment of my invention illustrated in Figs. 5 to 8 differs but in minor respects from that which I have just described. In these views the lock is represented as being so constructed and mounted that it rotates on its longitudinal axis in moving from locking to unlocking position, instead of moving longitudinally. This necessitates the groove 16' being circumferential instead of straight or longitudinal. The lock is key-operated and provided with a bolt 22 that is adapted to be projected out radially beyond the periphery of the cylinder casing of the lock or to be retracted so the end of such bolt is within the periphery of the lock casing, accordingly as the key is manipulated. There are recesses 23 formed in the part 10 of the gear case cap into which the end of the bolt 22 is adapted to enter when projected outwardly, one recess being arranged to receive the bolt when the lock casing is moved to position to lock the steering mechanism and the other to receive the bolt when the lock is turned to position to free the steering mechanism. The inner end of the lock casing is provided with an eccentrically located projection 24 seated in a recess provided therefor in a locking bolt 25. The rotation of the lock casing in its seat operates to reciprocate the bolt, the inner end of which enters one of the recesses 7 in the collar 5 secured to the pinion shaft when the latter is to be locked, but is withdrawn therefrom when moved to the other limit of its reciprocation (see Fig. 7.) The socket 27 in which the bolt 25 is seated has its outer end closed by a plate 26. The lock casing 14 has formed in it a groove or cut-away part 18 to permit the removal of the locking pin 8 when the lock casing is adjusted to cause this cut-away part to register with the groove 6, the same as in the form of invention already described.

Figure 9:
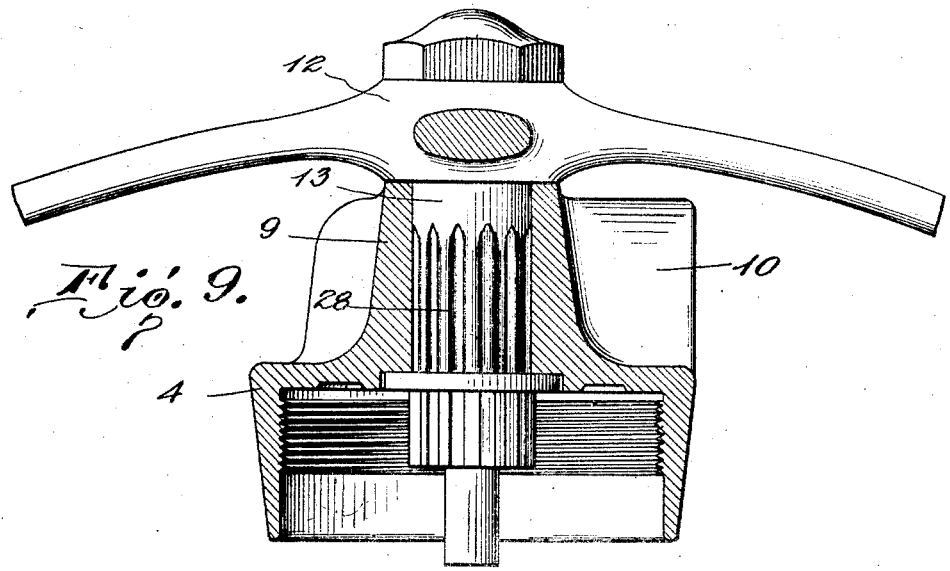
Fig. 9 is a vertical sectional view of another form of mechanism to which my invention is applied.
Figure 10:
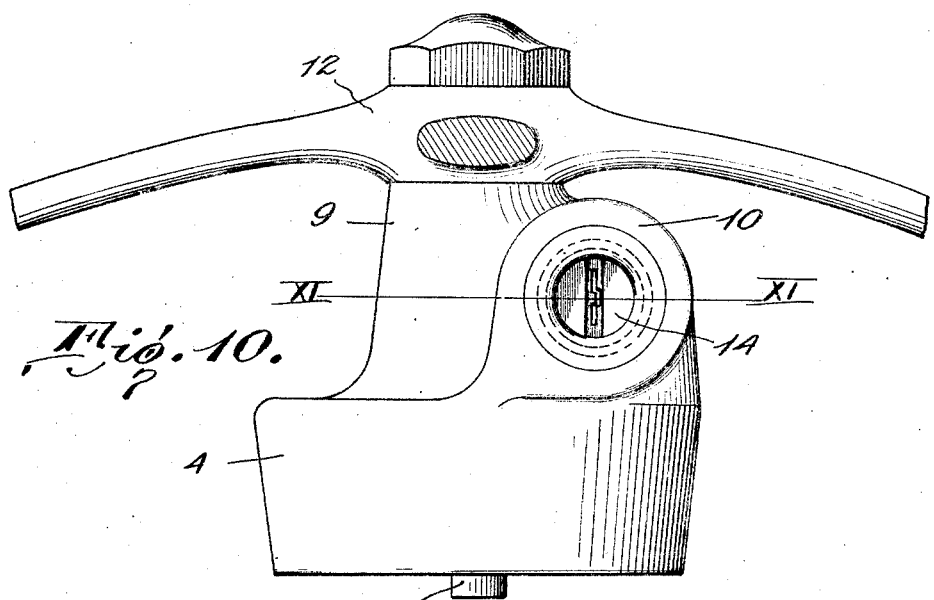
Fig. 10 is an elevation of the same.

In Figs. 9 to 12, inclusive, I illustrate a different embodiment of my invention. As represented in these views that portion of the pinion shaft 13 which is enclosed by the extension 9 of the cap of the gear case is formed with a series of peripheral grooves and ribs parallel with the axis of the shaft, as represented at 28. With this portion of the pinion shaft the circumferentially grooved portion 29 of a cylinder 33, mounted in a socket 27' formed to receive it in the part 10 of the gear case cap, is adapted to mesh when such cylinder is adjusted to the position represented in Fig. 12, thus locking the steering mechanism. The cylinder 33 occupies an extension 27' of the same socket as that in which the lock casing 14 is located, and is preferably in axial alignment therewith, and these two parts are connected so that rotation of the lock casing by the use of the proper key, produces a corresponding rotation of the cylinder 33. The cylinder is cut away on one side, as represented at 31, so that when turned to the position indicated in Fig. 11 this cut-away part lies opposite to the pinion shaft 13, with the result that the latter is free from interference of the cylinder and may be turned as may be required to effect steering. The lock casing is provided at its inner end with a lug or projection 24' that is adapted to enter a recess formed therefor in the cylinder 33, the connection between these parts thus formed insuring that they shall rotate together. A spring 34 forces the cylinder 33 towards the lock casing and maintains these parts in working relationship. The cylinder 33 when occupying its seat in the socket 27' intercepts the path of the locking pin 8 except when it is adjusted to the position indicated in Fig. 13, when a cut-away part 18' of the cylinder is, by the movement of the cylinder, brought into line with the path of the pin, which then may be removed, as has been described.

The locking mechanisms which I have described may be easily applied to Ford cars of standard equipment, without necessitating the substitution of a new steering wheel for that already on a car, it being only necessary to substitute the cap 4 and the parts that have been described as associated therewith for the ordinary cap of the gear case with which the car was originally equipped.

Having described my invention what I claim is:

1. The combination with a gear case and a cap therefor, of a gear lock carried by the cap and movable bodily into locking and unlocking positions, such movements being controlled by a key, a pin for uniting the case and cap and preventing one from turning upon the other, the gear lock being arranged to lie across and obstruct the seat for the locking pin when in gear-locking position, and to uncover the said seat when in unlocking position, the peripheral portion of the lock body that obstructs the pin seat as described being of hard material as compared with the rest of the body to resist attempts to tamper with the lock.

2. In a lock for the steering mechanism of an automobile, the combination with a gear case, a cap therefor united with the case by screw threads, the cap having formed in it an internal groove for the passage of a locking pin, the opposite ends of the said groove being open, a drive locking pin adapted to be passed through the said internal groove in the cap and to occupy a seat partly in such groove and partly in a groove in the screw-threaded portion of the gear case, for rigidly uniting the case and cap and preventing the latter from turning relative to the former, and a lock seated in the cap and movable bodily into locking and unlocking positions, such movements being controlled by a key, the seat in which the lock body is mounted intersecting the groove for the locking pin, whereby when the lock is inserted therein its body obstructs the groove, and a peripheral portion of the lock body being cut away so that when the lock is moved to position freeing the steering gear, the cut-away portion thereof comes opposite the groove and the latter is thus left free so that the pin may be removed.

3. In a lock for the steering mechanism of an automobile, the combination of a gear case, a cap therefor, a locking pin interengaging the gear case and cap to prevent the removal of the latter, a shaft to which a steering wheel is secured entering the gear case through the cap, and a key-operated lock for the steering shaft having a casing mounted in the cap of the gear case in position to cover the exposed end of the locking pin, the lock casing being bodily movable under the action of the key, and being formed with a tool-resisting section and a cut-away section which are spaced apart from each other, the tool-resisting portion of the lock overlying the locking pin when the lock casing is moved to lock the steering shaft, and the cut-away part overlying the pin when the lock casing is moved to release the shaft.

FREDERICK W. HENKE, Jr.